(No Model.)
G. W. KELSEY.
HORSE NETTING.
No. 373,371. Patented Nov. 15, 1887.
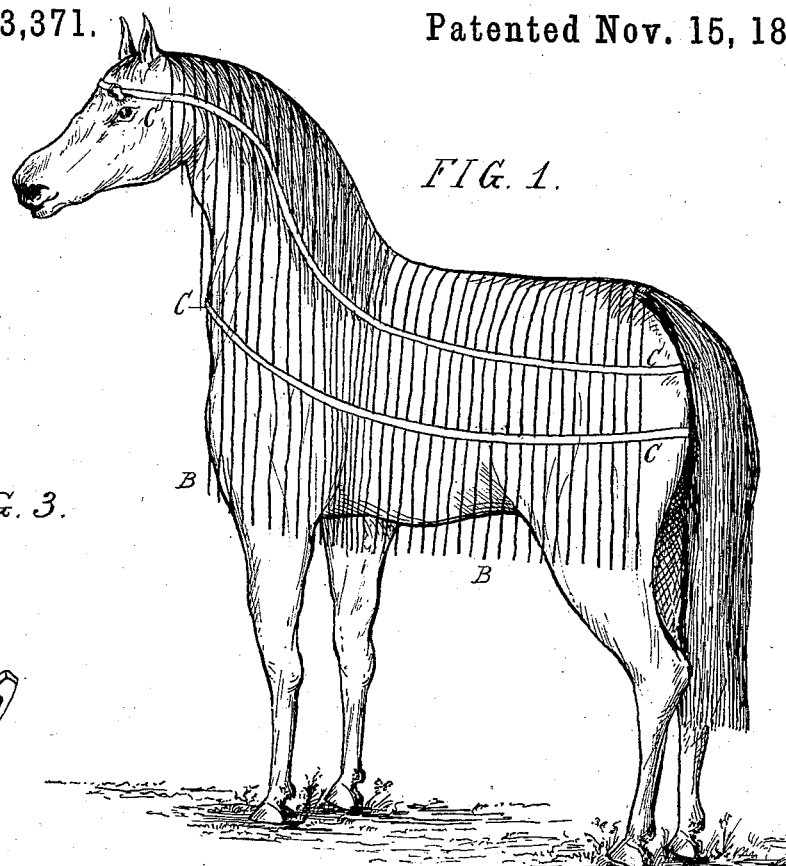
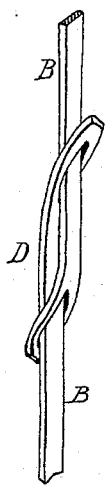
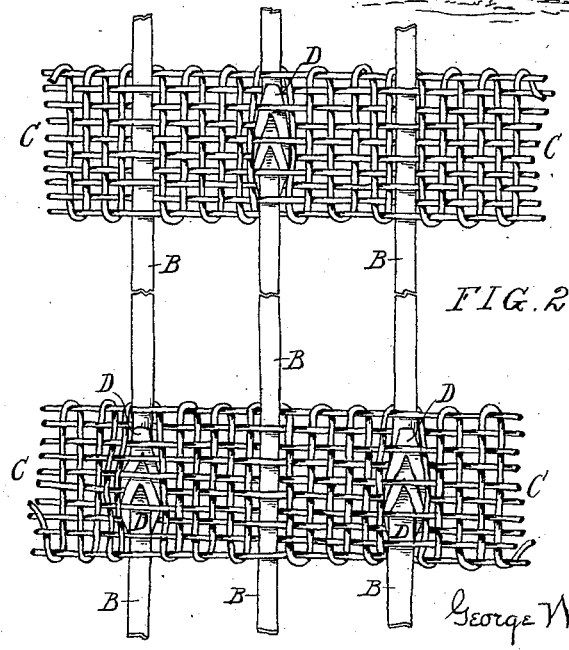
Witnesses
Albert Popking.
Jas. L. Skidmore.
Inventor
George W. Kelsey
By his Attorneys
Howson & Sons

UNITED STATES PATENT OFFICE.

GEORGE W. KELSEY, OF CHICAGO, ILLINOIS, ASSIGNOR TO MARY A. KELSEY, OF SAME PLACE.

HORSE-NETTING.

SPECIFICATION forming part of Letters Patent No. 373,371, dated November 15, 1887.

Application filed January 21, 1887. Serial No. 225,037. (No model.)

*To all whom it may concern:*

Be it known that I, GEORGE W. KELSEY, a citizen of the United States, residing in Chicago, Illinois, have invented a certain new and useful Improvement in Horse-Nets, of which the following is a specification.

My invention consists of an improvement on the horse-net forming the subject of John C. Ayres' patent, No. 218,019, dated May 25, 1880, the object of my invention being to cheapen the net and effectually prevent the slipping of the transverse strands of the same.

In the accompanying drawings, Figure 1 is a view showing my improved net applied to a horse, and Figs. 2 and 3 enlarged views illustrating those features of construction which constitute my invention.

The net forming the subject of the patent above alluded to was composed of longitudinal woven strips and transverse strands of leather interwoven with said strips where they crossed the same. The main objection to this net was its cost, each of the transverse leather strands of the net being made in one piece, so that it had to be cut from long and expensive stock.

In carrying out my invention I make the transverse strands of a number of pieces spliced together, each strand being composed of two or more pieces, B, preferably three, and the splice D being formed by splitting the end of each strand and passing the other strand through the slit, so as to cause the ends to interlock, as shown in Fig. 3. The sections B of the transverse strands are of such length that in interweaving them with the longitudinal strips C the enlargements caused by the splices engage with said strips, as shown in Fig. 2.

Where the transverse strands are composed of but two sections, the splices will preferably engage with the central strip of the net, and when composed of three sections one splice will engage with a longitudinal strip on one side of the net and the other splice with the longitudinal strip on the opposite side of the net, and it is preferable that the splices of successive strands shall not engage with the same longitudinal strip. For instance, as in Fig. 2, two strips C are shown. The splices of two strands are interwoven with one strip; but the intermediate strand has a plain portion interwoven therewith, its splice engaging with the other strip of the net. This lessens the strain upon the threads of the woven strip and renders the latter less bulky than it would be if the splice of each strand was interwoven therewith.

By making the strands of sections I am enabled to considerably lessen the cost of the same, as the sections can be cut from scrap or short pieces of leather. Moreover, the engagement of the splices with the woven strips effectually prevents any transverse slipping of the strands, and thus locks the latter firmly to the strips.

I claim as my invention—

1. A horse-net having longitudinal woven strips and transverse strands, each composed of two or more pieces spliced together, the splices forming enlargements engaging with the woven strips to prevent slipping of the strands, all substantially as specified.

2. A horse-net in which longitudinal woven strips are combined with transverse strands, each made of two or more pieces spliced together, said splices forming enlargements engaging with the woven strips, and the splices of alternate strands only engaging with the same strip.

GEORGE W. KELSEY.

Witnesses:
THOMAS A. BANNING,
GEORGE C. COOK.